United States Patent [19]

Warren et al.

[11] Patent Number: 4,505,874
[45] Date of Patent: Mar. 19, 1985

[54] VESSEL INSPECTION BOOM

[75] Inventors: Douglas H. Warren, West Springfield, Mass.; Timothy H. Wentzell, South Windsor, Conn.

[73] Assignee: Combustion Engineering Co., Inc., Windsor, Conn.

[21] Appl. No.: 355,617

[22] Filed: Mar. 8, 1982

[51] Int. Cl.³ .............................................. G21C 17/00
[52] U.S. Cl. ................................................... 376/249
[58] Field of Search ........................................ 376/249

[56] References Cited

U.S. PATENT DOCUMENTS

| | | | |
|---|---|---|---|
| 3,543,910 | 12/1970 | Devol et al. | 198/34 |
| 3,780,571 | 12/1973 | Wiesener | 376/249 |
| 3,809,607 | 5/1974 | Murray et al. | 376/249 |
| 3,862,578 | 1/1975 | Schluter | 376/249 |
| 3,943,756 | 3/1976 | Aubert et al. | 376/249 |
| 4,068,538 | 1/1978 | Stackhouse | 73/417 |
| 4,117,733 | 10/1978 | Gugel | 376/249 |
| 4,131,018 | 12/1978 | Muller et al. | 376/249 |
| 4,169,758 | 12/1979 | Blackstone et al. | 376/249 |
| 4,196,049 | 4/1980 | Burns et al. | 376/249 |
| 4,290,309 | 9/1981 | Charlebois et al. | 73/634 |
| 4,302,286 | 11/1981 | Lefebvre | 376/249 |
| 4,311,556 | 1/1982 | Iwamoto et al. | 376/249 |
| 4,368,644 | 1/1983 | Wentzell et al. | 376/249 |

FOREIGN PATENT DOCUMENTS 2544009 4/1977 Fed. Rep. of Germany ...... 376/249

Primary Examiner—Sal Cangialosi

[57] ABSTRACT

Reactor pressure vessel inspection apparatus which permits the non-destructive testing of the vessel lower head, shell and top flange taper areas without equipment modification. The inspection apparatus includes an articulated joint assembly which permits a transducer support arm to be rotated about three intersecting axes, the three axes defining two pair of transverse axes.

6 Claims, 3 Drawing Figures

VESSEL INSPECTION BOOM

BACKGROUND OF THE INVENTION

(1) Field of the Invention

The present invention relates to the inspection of the interior of containers and particularly to the in-service inspection of nuclear reactor pressure vessels. More specifically, this invention is directed to remotely controllable vessel inspection apparatus and especially to sensor supporting booms characterized by multiple degrees of freedom. Accordingly, the general objects of the present invention are to provide novel and improved methods and apparatus of such character.

(2) Description of the Prior Art

The core of a pressurized water nuclear reactor, of the type commonly employed by electrical utilities, is housed within a metal container which is referred to as the reactor pressure vessel. The pressure vessel will be generally of cylindrical shape and will, at the bottom thereof, have a hemispherical-shaped end or "bottom head" portion. Additionally, a "top flange" will be welded at the upper end of the vessel cylindrical or "shell" portion and inlet and outlet nozzles will extend through the vessel wall. Because of its dimensions and the gauge of the metal from which it is fabricated, a reactor pressure vessel is formed as segments which are welded together. The pressure vessel is itself housed within a concrete containment structure.

Safety regulations dictate that a reactor pressure vessel, and particularly the weld areas thereof, be inspected prior to use and periodically after the reactor is placed in service. The in-service inspections will be performed in an underwater, radioactive environment and thus require remotely controllable inspection apparatus. The vessel inspections include the non-destructive testing of the vessel wall employing ultrasonic energy. In order to accomplish the testing, a plurality of ultrasound transducers will be mounted on a "sled" which is caused to move along the vessel interior wall. The transducers will typically be spaced a short distances from the vessel wall and the ultrasonic energy coupled via the water in the vessel into the metal. The examination will produce a profile of the cross-section of the vessel wall. The information obtained from this volumetric examination of the metal will, in the case of a pre-service examination, show any inherent defects, particularly in the material around the welds. The in-service examinations will reveal defects which have arisen during use such as stress cracks and intergranular stress corrosion.

It is obviously highly desirable that the measurements taken during a reactor vessel in-service inspection be repeatable. Accordingly, the positioning and movements of the "sled" must be accurately controlled, from a remote location, and must be referenced to a common point or line. It has, in the past, been exceedingly difficult to achieve the desired repeatability of "sled" positioning and movements. Further, and perhaps more significantly, prior in-service reactor pressure vessel inspection apparatus was characterized by inflexibility. That is, for each portion of the vessel interior to be inspected, it was necessary to actually effect mechanical changes to the "sled" supporting arm or the "sled" itself. The necessity of changing the arm or the equipment mounted thereon greatly increased the cost of performing a pressure vessel inspection.

For a general discussion of reactor pressure vessel inspection, reference may be had to U.S. Pat. No. 4,302,286. The inspection apparatus, for example as depicted in FIG. 2 of U.S. Pat. No. 4,302,286, is exemplary of the prior art wherein the ultrasound transducer supporting arm is capable of movement only about a single pivot axis.

SUMMARY OF THE INVENTION

The present invention overcomes the above-briefly discussed and other deficiencies and disadvantages of the prior art by providing a novel and improved pressure vessel inspection system which includes a remotely controlled and articulated transducer support mechanism having multiple degrees of freedom. Accordingly, the present invention provides complete access to the inside surface of a pressurized water reactor vessel, including the bottom head, shell and top flange taper areas, without having to make any changes in or modifications to the inspection apparatus. The motion of the transducer support mechanism of the present invention may be controlled, pursuant to a computer program, to position and subsequently move an ultrasonic search unit on the vessel wall.

Apparatus in accordance with a preferred embodiment of the invention comprises transducer support apparatus having three degrees of freedom of motion. The support apparatus includes a single elongated inspection arm that is rotatable about its own axis and simultaneously about a second axis which is transverse to an extension of the axis of the inspection arm. The transducer or transducers which perform the actual inspection are mounted on a first end of the inspection arm and motion is imparted to the inspection arm by means of an actuator assembly including a pair of variable speed motors which are coupled to the second end of the inspection arm and which may be individually or simultaneously energized. The support apparatus is also provided with encoders which provide continuous readout of the rotary position of the arm relative to the two axes of rotation thereof. The inspection arm actuator assembly is sealed for underwater operation.

The inspection arm and its actuator assembly are mounted at the lower end of a telescopic boom which, when in use, is supported so as to be coaxial with the vessel being inspected. A further actuator is provided to impart rotation to the inspection arm about the axis of the boom. The axes about which the inspection arm may be rotated by its actuator assembly intersect at a prolongation of the boom axis.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES in which.

DESCRIPTION OF THE PREFERRED EMBODIMENT

Figure 1:
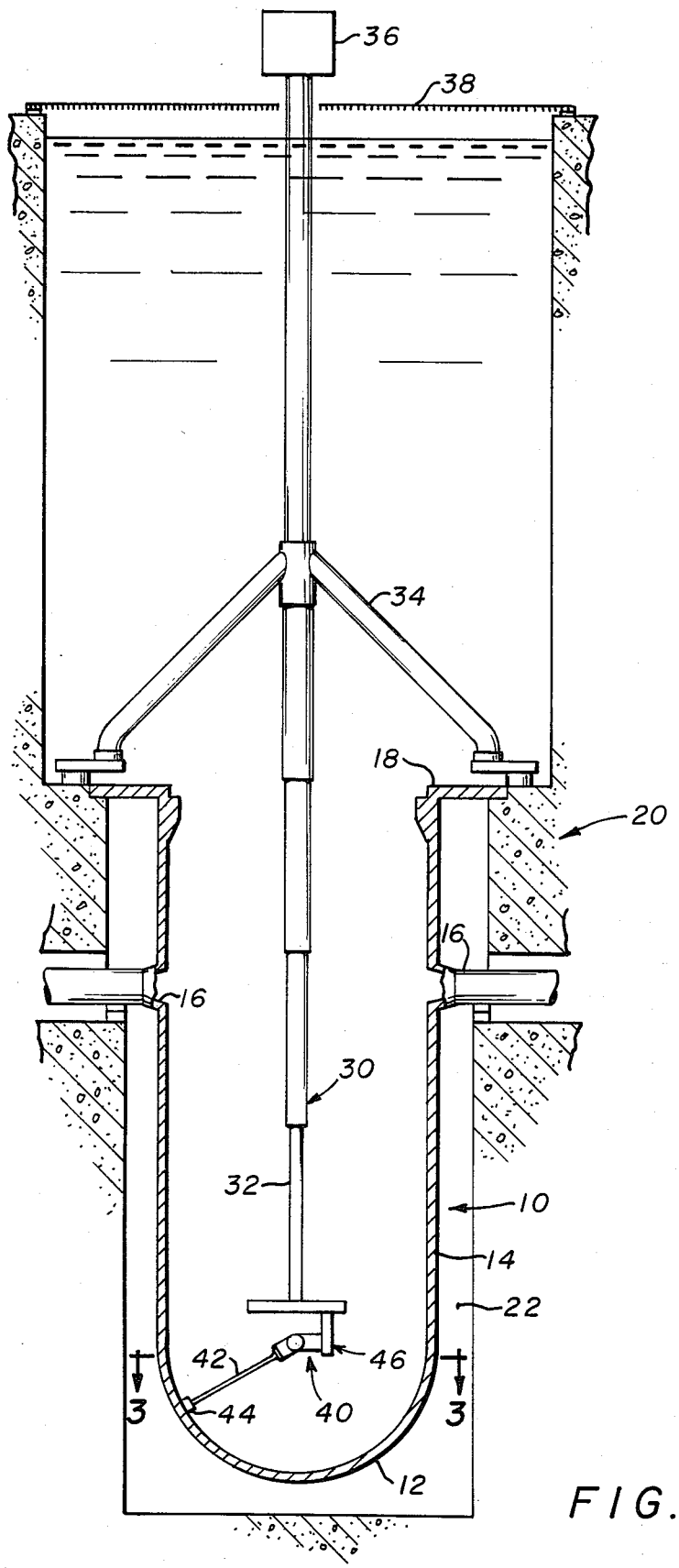
FIG. 1 is a schematic side-elevation view depicting use of the present invention to inspect a reactor pressure vessel.

With reference to FIG. 1, a reactor pressure vessel is indicated generally at 10. Pressure vessel 10 includes a hemispherically shaped lower head 12, a generally cylindrical shell 14 extending upwardly from head 12, inlet and outlet nozzles 16 and a top flange area 18. Pressure vessel 10 is shown in condition for an in-service inspection which is to be performed after the top head and reactor core have been removed. A partial inspection can be performed without removal of the reactor core. Pressure vessel 10 is mounted, by means of flange 18, from a ledge of a containment structure, indicated generally at 20, which is comprised of concrete. The containment structure 20 will be provided with a lower cavity 22 which receives the lower portions of vessel 10 including the lower head 12. During use and during the inspection procedure the vessel 10 and the containment structure above flange 18 will be filled with water.

The inspection of pressure vessel 10 is accomplished by the insertion, on the axis of the cylindrical shell 14, of the inspection system which has been indicated generally at 30. Inspection system 30 includes an elongated telescopic boom 32 which will be positioned so as to be coaxial with vessel shell 14. Boom 32 is supported, by means of legs 34, from a ledge within the containment structure. The control and power supply 36 for inspection system 30 may be positioned on a work platform 38 which spans the containment structure above vessel 10.

The inspection system 30 further comprises a transducer assembly which has been indicated generally at 40. Transducer assembly 40 includes an inspection arm 42 which, at its outwardly disposed end, supports a "sled" 44. The sled 44 is provided with casters so that it may freely travel on the inside wall of vessel 10. A plurality of ultrasound transducers are mounted on sled 44 so as to be spaced, in accordance with the preferred embodiment of the invention, a short distance from the vessel wall. Ultrasound energy produced by excitation of the transducers will thus be coupled into the metal vessel wall via a water path and echos resulting from reflection or ultrasound energy from the vessel wall surfaces and inhomogenities within the metal will be coupled back to the transducers via the water path.

The second end of arm 42 is affixed to an actuator assembly which has been indicated generally at 46. The actuator assembly, as will be described in greater detail below in the discussion of FIG. 2, comprises a pair of members which are rotatable about a pair of transverse axes which intersect at an extension of the axis of boom 32. Additionally, the arm 42 may be rotated about the axis of boom 32 and thus about the axis of vessel 10.

Figure 2:
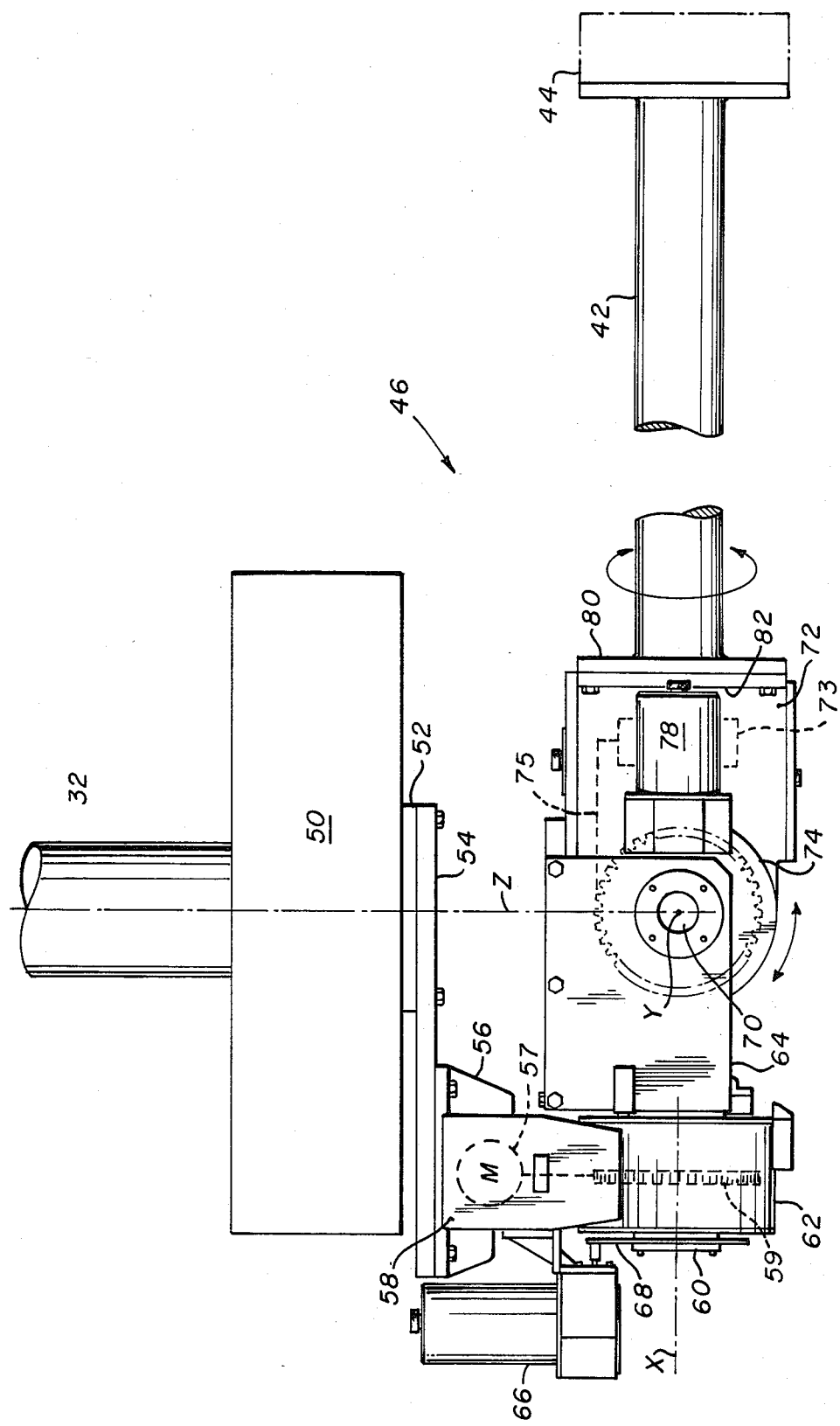
FIG. 2 is an enlarged side elevation view of apparatus in accordance with a preferred embodiment of the present invention.

With reference now to FIG. 2, the actuator assembly 46 comprises a series of remotely controllable mechanisms which may be employed to impart three degrees of movement to arm 42. The first of these mechanisms comprises a rotatable table assembly 50 which is affixed to the lower end of boom 32. The table assembly 50, which has been employed in prior art pressure vessel inspection apparatus, includes a reversible electric motor and appropriate gearing whereby rotation may be imparted to an output member 52 which is coaxial with boom 32. The housing of assembly 50 will, of course, be hermetically sealed and the assembly will include a position sensor whereby the angular orientation of a plate 54, which is affixed to output member 52, may be constantly monitored and transmitted to the control apparatus.

Plate 54 is typically bolted to output member 52, for rotation therewith and extends generally radially outward with respect to the common boom and vessel axis Z as shown. The inspection arm assembly, which includes a pair of series connected pivot mechanisms, is suspended from plate 54. The first of these pivot mechanisms imparts rotation to arm 42 about a first axis which may be considered the X axis. This first pivot mechanism is attached to plate 54 via a mounting flange 56 and includes a reversible variable speed DC motor 57 mounted within a hermetically sealed housing 58. The drive shaft of the motor 57 within housing 58 is coupled, via suitable gearing 59, to a rotatable output member 60 which is supported within a bearing assembly 62. A pivot support assembly, which comprises a pair of parallel plates, only one of which may be seen at 64, is affixed to output member 60 for rotation therewith. Member 60 is supported such that its axis, i.e., the X axis of the system, is transverse to and intersects the axis of boom 32 which may be considered the system Z axis. The instantaneous angular orientation of member 60 will be sensed by a position sensor 66 which is coupled to member 60 via a gear train including a drive gear 68.

A pivot shaft 70 extends between the rotatable, parallel support plates 64. The axis of pivot shaft 70, which may be considered the system Y axis, intersects an extension of the axis of output member 60 and is transverse thereto. The axis of pivot shaft 70 also intersects the Z axis and these two axes, i.e., the axes of member 60 and shaft 70, define a rotatable horizontal plane. The second of the series connected pivot assemblies is identical in construction to the first pivot assembly and includes a hermetically sealed housing 72 for a third reversible variable speed DC motor 73. The housing 72 may be caused to rotate about shaft 70 by energizing the motor 73 in housing 72, the motor output shaft being coupled to a stationary gear keyed to shaft 70 by appropriate intermediate gears 75. The second pivot assembly includes a bearing housing 74 and a position sensor 78. The intersecting axes of boom 32 and shaft 70 define a first rotatable vertical plane while the intersection of the axes of boom 32 and member 60 define a second rotatable vertical plane which is transverse to both the first vertical plane and to the horizontal plane.

The inspection arm 42 is provided, at its inwardly disposed end, with an integral mounting plate 80 which is bolted to a plate 82 which forms part of pivot assembly housing 72. Arm 42 is mounted such that it's longitudinal axis is aligned with axis X, i.e., the axis of member 60. Arm 42 is thus rotatable about its own axis and about the point of intersection of axes X, Y and Z. When the length of boom 32 is such as to position the apparatus as shown in FIG. 1, this intersection or pivot point is at the center of curvature of the bottom head 12 of vessel 10. Accordingly, rotation of arm 42 about axes X and Y permits complete inspection of the bottom head. When bottom head inspection has been completed, the assembly may be raised along the vessel center line whereby vessel shell longitudinal and circumferential wells may be inspected, by causing rotation about the axis of boom 32, without modifying the inspection apparatus. Additionally, by pivoting the arm 42 such that the X axis extends upwardly above horizontal, i.e., the sled 44 is positioned higher than pivot shaft 70, the inwardly tapered area of the flange 18 may also be inspected.

Figure 3:
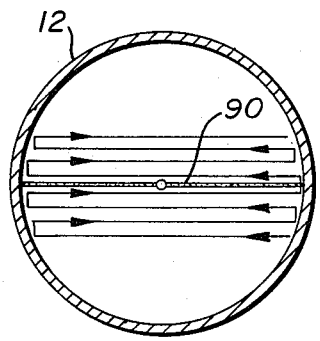
FIG. 3 is a view, taken along line 3—3 of FIG. 1, which depicts a scanning mode employed during testing of the pressure vessel lower head weld seam with the apparatus of FIG. 2.

Referring to FIG. 3, the bottom head 12 of pressure vessel 10 is depicted. One mode of pressure vessel construction employed in the nuclear industry consists of the forming of the hermispherical bottom head in two sections which are joined by means of a weld 90. In performing an in-service inspection, the weld itself and areas to either side thereof are of special interest. In order to obtain the requisite information concerning the condition of the metal in the weld seam and to either side thereof, it is highly desirable that the sled 44 be moved along a series of parallel paths, as indicated by the arrows in FIG. 3, and that the motion of the sled be precisely reproducable. This is easily achieved employing the present invention. It is also known in the prior art to fabricate a pressure vessel bottom head by employing a central dish of continuous construction to which are welded a plurality of segments. In testing a pressure vessel of this type of construction, the present invention enables the movement of sled 44 in a series of concentric circles about the weld line between the central dish and the segements and also along the radially outwardly extending weld lines between adjacent segments.

While a preferred embodiment has been shown and described, various modifications and substitutions may be made thereto without departing from the spirit and scope of the invention. Accordingly, it is to be understood that the present invention has been described by way of illustration and not limitation.

We claim:

1. In apparatus for the non-destructive testing of the wall of a nuclear reactor pressure vessel, the pressure vessel having a hemispherically shaped lower head portion and a cylindrical portion extending therefrom, the apparatus including a transducer mounted on the end of a support arm so as to be juxtapositioned to the inner surface of the vessel wall, the apparatus further including an elongated boom and means for supporting said boom co-axially with the pressure vessel cylindrical portion, the boom extending into the vessel from an exterior location, improved means for coupling the transducer support arm to the boom comprising:

first articulated joint means, said first joint means including first and second housing means which are relatively rotatable about a first pivot axis, said first pivot axis being intersected by an extension of the boom axis, the boom axis extension and first pivot axis defining a first plane;

means affixing the first of said joint means housing means to a first end of the support arm whereby the support arm will move with said first joint means first housing means;

second articulated joint means, said second joint means including first and second housing means which are relatively rotatable about a second pivot axis, said second pivot axis being transverse to and intersecting both said first pivot axis and the boom axis, said second axis being offset from the axis of the boom, said first and second pivot axes defining a second plane which is transverse to said first plane, said second pivot axis and the boom axis defining a third plane which is transverse to each of said first and second planes;

means affixing the second of said first joint means housing means to the first of said second joint means housing means whereby said first joint means will move with said second joint means first housing means;

means for rotatably coupling said second joint means housing means to the boom whereby said interconnected first and second joint means may be caused to rotate as a unit about the axis of the boom;

first motor means mounted within one of said first joint means housing means, said first motor means producing relative rotation between said first joint means first and second housing means;

second motor means mounted within one of said second joint means housing means, said second motor means producing relative rotation between said second joint means first and second housing means independently of rotation between said first joint means housing means; and position sensor means for continuously monitoring the angular relation between each of said joint means first and second housing means and providing signals commensurate therewith.

2. The apparatus of claim 1 wherein at least one of each of said joint means housing means is a hermetically sealed enclosure and wherein a motor is mounted within said enclosure, energization of said motor producing the relative rotation about the pivot axis.

3. The apparatus of claim 2 wherein said means for coupling said second joint means second housing means to the boom comprises:

plate means, said plate means extending radially outwardly with respect to the boom axis, said second joint means second housing means being affixed to said plate means at a location displaced from the boom axis; and means for imparting rotation to said plate means whereby said series connected first and second joint means will rotate as a unit about the extension of the boom axis.

4. The apparatus of claim 3 wherein the spacing between said second joint means second housing means and the boom axis and the length of said first joint means second housing are selected such that said first pivot axis is intersected by an extension of the boom axis.

5. The apparatus of claim 2 wherein said first plane is a vertical plane rotatable about the boom axis and wherein said second plane is rotatable about said second pivot axis.

6. The apparatus of claim 4 wherein said first plane is a vertical plane rotatable about the boom axis and wherein said second plane is rotatable about said second pivot axis.

* * * * *